United States Patent
Oh et al.

(10) Patent No.: US 11,952,055 B1
(45) Date of Patent: Apr. 9, 2024

(54) ELECTRIC INDEPENDENT STEERING APPARATUS

(71) Applicants: Seohan Innobility Co., Ltd., Chungcheongbuk-do (KR); Korea Movenex Co., Ltd., Ulsan (KR)

(72) Inventors: Byung Ki Oh, Hwaseong-si (KR); Jae Geun Bang, Hwaseong-si (KR)

(73) Assignees: Seohan Innobility Co., Ltd., Chungcheongbuk-do (KR); Korea Movenex Co., Ltd., Ulsan (KR)

( * ) Notice: Subject to any disclaimer, the term of this patent is extended or adjusted under 35 U.S.C. 154(b) by 0 days.

(21) Appl. No.: 18/286,751

(22) PCT Filed: Jan. 21, 2022

(86) PCT No.: PCT/KR2022/001149
§ 371 (c)(1),
(2) Date: Oct. 12, 2023

(87) PCT Pub. No.: WO2022/220378
PCT Pub. Date: Oct. 20, 2022

(30) Foreign Application Priority Data

Apr. 14, 2021 (KR) .................. 10-2021-0048213

(51) Int. Cl.
*B62D 5/04* (2006.01)
*B62D 7/18* (2006.01)
(52) U.S. Cl.
CPC ............ *B62D 5/0418* (2013.01); *B62D 5/04* (2013.01); *B62D 7/18* (2013.01)
(58) Field of Classification Search
CPC .......... B62D 5/04; B62D 5/0418; B62D 7/18; B62D 5/26; B62D 7/146; B62D 5/046;
(Continued)

(56) References Cited

U.S. PATENT DOCUMENTS 1,302,489 A * 4/1919 Hollis ................... B60B 35/109
301/124.1
1,840,407 A * 1/1932 Norman ............... B60L 15/2054
180/65.6
(Continued)

FOREIGN PATENT DOCUMENTS

CN 106741144 A 5/2017
JP 4636256 B2 2/2011
(Continued)

OTHER PUBLICATIONS

International Search Report in International Application No. PCT/KR2022/001149, dated May 6, 2022, 3 pages.

*Primary Examiner* — Drew J Brown
*Assistant Examiner* — Timothy Wilhelm
(74) *Attorney, Agent, or Firm* — Park, Kim & Suh, LLC

(57) ABSTRACT

The present invention provides an electric independent steering apparatus comprising: a first knuckle having one end coupled to the lower end of a strut part, and including an upper support part extending and protruding outwardly from the one end and a lower support part extending and protruding from the other end so as to face the upper support part; a second knuckle which is rotatably disposed on the lower support part inside the first knuckle, has a motor installed therein, and has a driving wheel coupled to the outside thereof; and a harmonic gear which is disposed so as to be rotatable from the upper support part and relatively rotates from the first knuckle together with the second knuckle.

7 Claims, 14 Drawing Sheets

(58) Field of Classification Search
CPC ...... B60G 15/02; B60G 5/26; B60G 2200/44;
B60G 2204/4191; B60G 2300/50; B60G
3/06; B60G 3/18; B60G 15/06; B60G
2200/144; B60G 2204/419; B60G 3/20;
B60G 11/06; B60G 7/006; B60G 7/02;
B60K 11/06; B60K 11/08; B60K 7/0007;
B60K 17/043; B60K 2007/0038; B60K
2007/0092; B60Y 2200/221
See application file for complete search history.

(56) References Cited

U.S. PATENT DOCUMENTS

| | | | | |
|---|---|---|---|---|
| 2,299,241 A * | | 10/1942 | Kumm | B60G 3/01 267/254 |
| 2,936,034 A * | | 5/1960 | Der Lely | B60B 35/14 180/41 |
| 3,085,644 A * | | 4/1963 | Der Lely | B62D 1/12 180/440 |
| 3,236,324 A * | | 2/1966 | Levratto | B62D 49/0607 180/242 |
| 3,306,390 A * | | 2/1967 | Georges | B62D 61/12 180/41 |
| 3,509,957 A * | | 5/1970 | Loffler | B60G 3/24 280/124.13 |
| 3,572,458 A * | | 3/1971 | Tax | B62D 7/02 180/411 |
| 3,899,037 A * | | 8/1975 | Yuker | B60G 17/01925 180/41 |
| 4,003,584 A * | | 1/1977 | Zelli | B66F 11/048 280/47.11 |
| 4,241,803 A * | | 12/1980 | Lauber | B60P 3/40 280/765.1 |
| 4,363,374 A * | | 12/1982 | Richter | B62D 49/0607 180/209 |
| 4,395,191 A * | | 7/1983 | Kaiser | E02F 9/085 180/7.1 |
| 4,802,688 A * | | 2/1989 | Murakami | B60G 7/008 280/124.138 |
| 5,039,129 A * | | 8/1991 | Balmer | B60G 3/04 180/209 |
| 5,121,808 A * | | 6/1992 | Visentini | B62D 7/20 301/128 |
| 5,137,101 A * | | 8/1992 | Schaeff | E02F 9/04 180/8.1 |
| 5,655,615 A * | | 8/1997 | Mick | B62D 49/0607 280/5.2 |
| 5,782,484 A * | | 7/1998 | Kuhn, Jr. | B60G 3/265 267/248 |
| 5,938,219 A * | | 8/1999 | Hayami | B60G 3/20 280/124.135 |
| 6,036,201 A * | | 3/2000 | Pond | B60G 15/12 280/5.514 |
| 6,056,304 A * | | 5/2000 | Brambilla | B60G 9/02 280/124.167 |
| 6,119,882 A * | | 9/2000 | Crook | B66F 11/046 180/906 |
| 6,199,769 B1 * | | 3/2001 | Weddle | F16F 9/06 180/906 |
| 6,343,804 B1 * | | 2/2002 | Handke | B60G 13/006 280/124.145 |
| 6,347,802 B1 * | | 2/2002 | Mackle | B62D 17/00 280/5.521 |
| 6,443,687 B1 * | | 9/2002 | Kaiser | E02F 9/024 180/209 |
| 6,540,243 B2 * | | 4/2003 | Takayanagi | B62K 5/08 280/778 |
| 6,726,394 B2 * | | 4/2004 | Garnier | B61F 5/24 403/135 |
| 6,729,633 B1 * | | 5/2004 | Irwin | B62D 17/00 280/86.75 |
| 6,752,403 B2 * | | 6/2004 | Allen | B60G 17/005 280/124.1 |
| 6,761,234 B1 * | | 7/2004 | Lamela | B62D 7/142 280/8 |
| 6,776,425 B2 * | | 8/2004 | Britton | B62D 13/06 280/103 |
| 6,783,137 B2 * | | 8/2004 | Nagreski | F16C 19/54 280/124.135 |
| 6,968,913 B1 * | | 11/2005 | Priepke | E02F 9/02 180/6.24 |
| 7,111,857 B2 * | | 9/2006 | Timoney | B62D 55/112 280/124.128 |
| 7,117,599 B2 * | | 10/2006 | Sadanowicz | B62D 7/18 29/894.362 |
| 7,140,625 B2 * | | 11/2006 | Dean | B60G 13/006 280/93.512 |
| 7,198,121 B2 * | | 4/2007 | Lamela | B60K 17/342 474/144 |
| 7,198,278 B2 * | | 4/2007 | Donaldson | B62D 49/08 180/209 |
| 7,204,341 B2 * | | 4/2007 | Lundmark | B62D 5/0418 180/444 |
| 7,294,082 B2 * | | 11/2007 | Lim | B62D 7/142 475/221 |
| 7,398,982 B2 * | | 7/2008 | Hozumi | B60G 3/20 280/124.135 |
| 7,762,372 B2 * | | 7/2010 | LeBlanc, Sr. | B62D 7/18 180/385 |
| 7,841,802 B2 * | | 11/2010 | Fockersperger, Jr. | E02F 5/102 405/184 |
| 7,862,057 B2 * | | 1/2011 | Hilmann | B62D 7/06 280/93.511 |
| 7,866,434 B2 * | | 1/2011 | Shiino | B62D 7/08 280/93.512 |
| 7,891,674 B2 * | | 2/2011 | Vaxelaire | B60G 7/001 280/86.758 |
| 7,926,613 B2 * | | 4/2011 | Matsuda | B62D 5/008 180/443 |
| 8,051,940 B2 * | | 11/2011 | Ziech | B60K 7/0015 180/257 |
| 8,152,185 B2 * | | 4/2012 | Siebeneick | B60G 7/008 280/124.134 |
| 8,170,792 B2 * | | 5/2012 | Mizuno | B60G 17/016 701/409 |
| 8,205,900 B1 * | | 6/2012 | Moravy | B60G 3/20 280/124.138 |
| 8,267,416 B2 * | | 9/2012 | Allen | B60G 3/20 280/124.135 |
| 8,286,979 B2 * | | 10/2012 | Schote | B60G 3/20 280/124.135 |
| 8,322,729 B2 * | | 12/2012 | Michel | B60G 7/008 280/5.52 |
| 8,376,078 B2 * | | 2/2013 | Hiddema | B60B 35/001 180/209 |
| 8,490,983 B2 * | | 7/2013 | Schmid | B60G 7/008 280/5.521 |
| 8,573,615 B2 * | | 11/2013 | Kuwabara | B60G 3/06 280/124.145 |
| 8,690,177 B2 * | | 4/2014 | Buchwitz | G06F 16/245 280/124.135 |
| 9,266,557 B2 * | | 2/2016 | Matayoshi | B60G 3/20 |
| 9,333,824 B2 * | | 5/2016 | Zandbergen | B60G 3/20 |
| 9,387,881 B2 * | | 7/2016 | Smith | B60G 11/28 |
| 9,643,464 B2 * | | 5/2017 | Zandbergen | B60G 3/20 |
| 9,821,835 B2 * | | 11/2017 | Ferrer-Dalmau Nieto | B62D 5/26 |
| 10,106,006 B2 * | | 10/2018 | Andou | B60G 13/005 |
| 10,160,486 B2 * | | 12/2018 | Kim | B62D 15/023 |
| 10,604,186 B2 * | | 3/2020 | Tanaka | B60G 3/20 |
| 10,745,051 B2 * | | 8/2020 | Tanaka | B62D 21/11 |
| 10,806,106 B2 * | | 10/2020 | Olson | B62D 17/00 |
| 11,192,413 B2 * | | 12/2021 | Brenner | B60G 7/008 |
| 11,584,427 B2 * | | 2/2023 | Kuribayashi | B62D 7/18 |
| 2003/0205424 A1 * | | 11/2003 | Felsing | B60G 7/008 180/242 |
| 2003/0234504 A1 * | | 12/2003 | Frantzen | B60G 3/20 280/93.512 |

(56) References Cited

U.S. PATENT DOCUMENTS

| | | | |
|---|---|---|---|
| 2004/0084822 A1* | 5/2004 | Collyer | F16F 1/30 267/293 |
| 2005/0280241 A1* | 12/2005 | Bordini | B60G 3/18 280/124.135 |
| 2007/0045036 A1* | 3/2007 | Takeuchi | B62D 5/0418 280/124.145 |
| 2008/0067773 A1* | 3/2008 | Chalin | B60G 7/001 280/124.135 |
| 2010/0276904 A1* | 11/2010 | Pavuk | B60G 3/202 280/124.135 |
| 2012/0242055 A1* | 9/2012 | Starck | B60G 15/068 267/141 |
| 2013/0020775 A1* | 1/2013 | Beji | B60B 35/10 280/43 |
| 2016/0144891 A1* | 5/2016 | Reubens | B62D 7/06 280/93.512 |
| 2017/0137059 A1* | 5/2017 | Ohba | B60G 3/26 |
| 2019/0283515 A1* | 9/2019 | Paerewyck | F16C 23/045 |
| 2020/0223478 A1* | 7/2020 | Sano | B60G 15/062 |
| 2021/0245561 A1* | 8/2021 | Sardes | B60G 3/207 |
| 2023/0051754 A1* | 2/2023 | Chang | B62D 5/001 |
| 2023/0159086 A1* | 5/2023 | Lee | B62D 7/146 180/413 |
| 2023/0302860 A1* | 9/2023 | Jeon | B62D 5/0418 |
| 2023/0391181 A1* | 12/2023 | Min | B60G 3/00 |

FOREIGN PATENT DOCUMENTS

| | | |
|---|---|---|
| JP | 2020-100399 A | 7/2020 |
| KR | 10-2019-0041855 A | 4/2019 |
| KR | 10-2313267 B1 | 10/2021 |

* cited by examiner

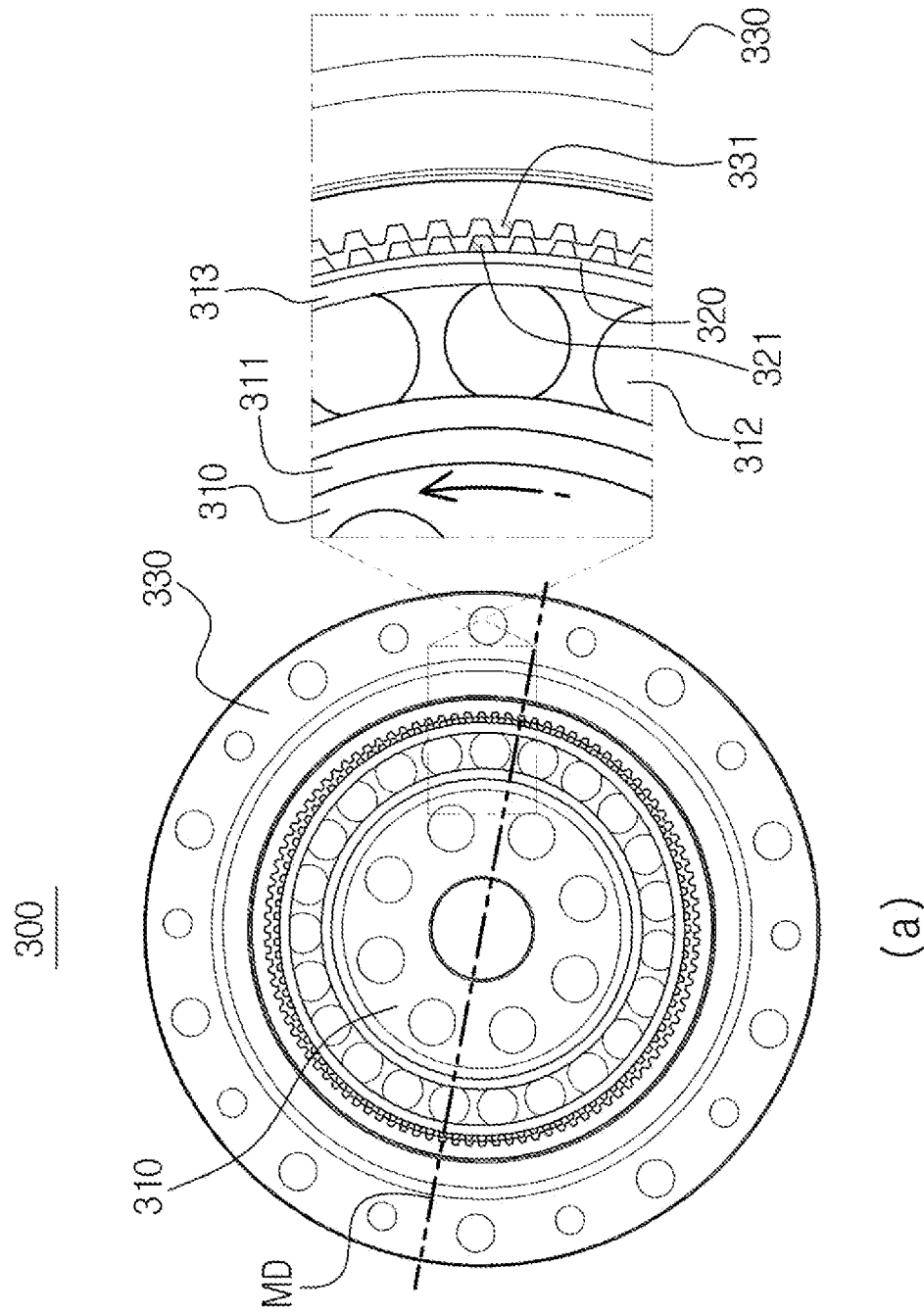

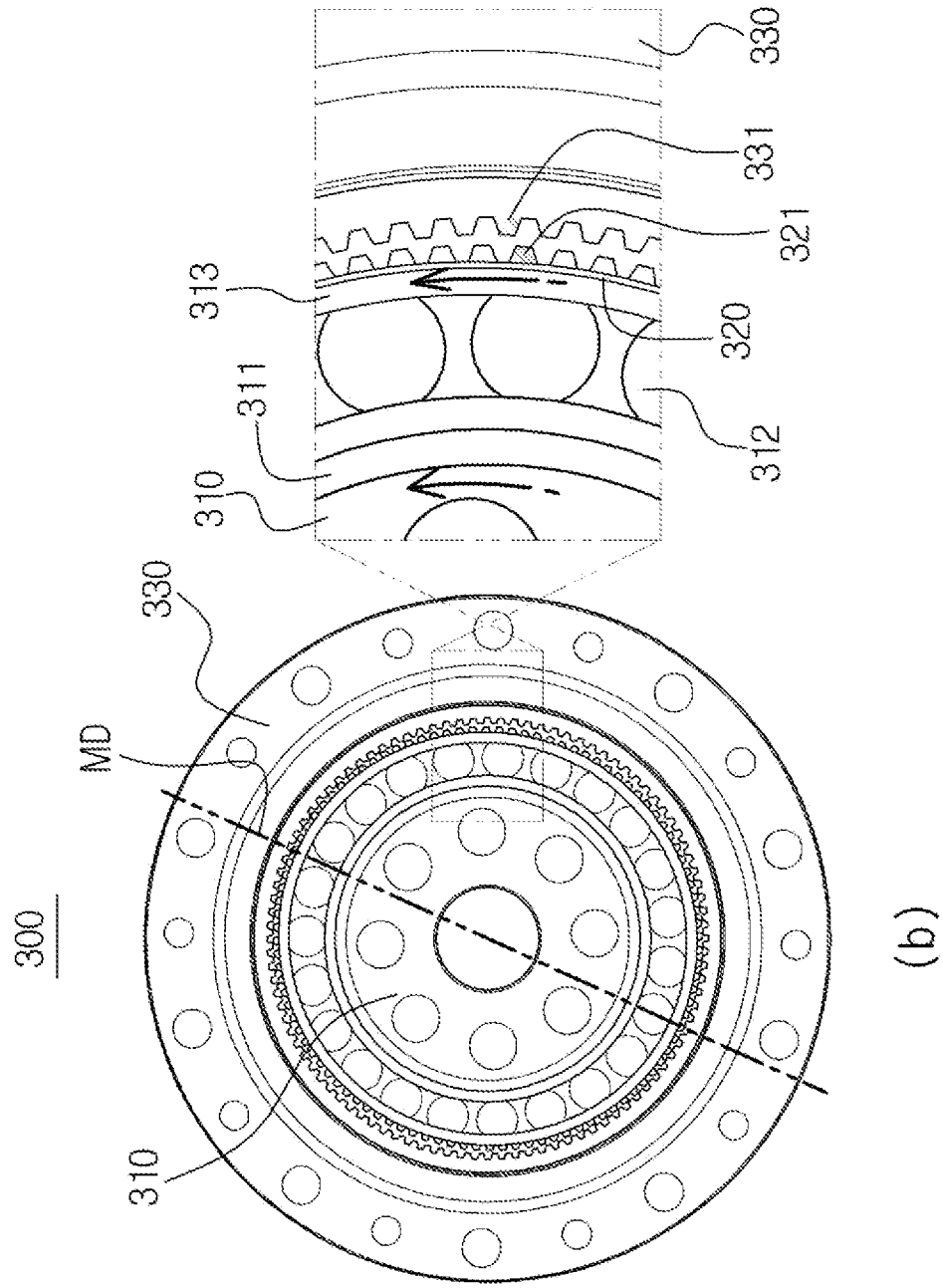

ELECTRIC INDEPENDENT STEERING APPARATUS

CROSS-REFERENCE TO RELATED APPLICATIONS

This application is a National Phase Application of PCT International Application No. PCT/KR2022/001149, which was filed on Jan. 21, 2022, and which claims priority from Korean Patent Application No. 10-2021-0048213 filed on Apr. 14, 2021. The disclosures of the above patent applications are incorporated herein by reference in their entirety.

TECHNICAL FIELD

The present disclosure relates to an electric independent steering apparatus, and more particularly to an electric independent steering apparatus that independently controls all driving wheels of a vehicle.

BACKGROUND ART

In general, power steering systems have problems in that their configurations such as pumps, gearboxes with power cylinders, and piping are complex, it is difficult to precisely control steering assistance force, and power steering does not operate when oil is leaked. Accordingly, an electric steering device that enables steering with a simple configuration and uses to enable precise control of auxiliary force is developed.

This electric steering device has a structure in which a drive link is installed on a motor to enable forward/backward movement via a ball screw, a pivot link is connected to the drive link, a tie rod is connected to the pivot link, and the tie rod is connected to a knuckle.

Therefore, the drive link moves forward/backward in a rotation direction of the motor, and thus the pivot link pivots clockwise or counterclockwise, and the tie rod connected to the pivot link is pulled or pushed to change a direction of the wheel.

However, a conventional electric steering device requires a complicated connection structure as described above and has a limit in controlling a steering angle.

DISCLOSURE

Technical Problem

An object of the present disclosure is to solve this problem, and more specifically, the object of the present disclosure is to provide an electric independent steering apparatus having a simplified configuration by installing the steering device on a knuckle connecting a vehicle and a wheel.

An object of the present disclosure is to provide an electric independent steering apparatus that independently controls each wheel of a vehicle and rotates a wheel up to 90 degrees.

Technical Solution

To achieve the objects, the present disclosure provides an electric independent steering apparatus including a first knuckle having one end coupled to a lower end of a strut portion and including an upper support extending and protruding outward from the end thereof and a lower support extending and protruding from a remaining end to face the upper support, a second knuckle arranged to be rotatable on the lower support inside the first knuckle and including a motor installed therein and a driving wheel coupled to an outside thereof, and a harmonic gear disposed to be rotated from the upper support and rotating relative to the first knuckle with the second knuckle.

The electric independent steering apparatus may further include a hub bearing provided between the second knuckle and the driving wheel, a wheel disk coupled onto the hub bearing, and a braking portion coupled to the second knuckle to limit rotational force of the wheel disk.

The harmonic gear may include a bearing portion including an inner ring connected to the rotation shaft of the motor and shaped like an oval and an outer ring that is elastically deformed along the oval shape of the inner ring through a plurality of balls provided outside the inner ring, an elastic spline cover that is elastically deformed along an oval shape as the bearing portion is inserted into one side of an open inner peripheral surface of the elastic spline cover, includes a medial tooth shape provided on one side of an outer peripheral surface of the elastic spline cover, and having a remaining side fixed and connected to the upper support, and a housing into which the elastic spline cover is inserted and which has an inner peripheral surface on which external tooth shapes engaged with both sides in a long axis direction of the medial tooth shape are formed and pivots relative to the fixed elastic spline cover along with rotation of the bearing portion.

In the harmonic gear, rotation directions of the bearing portion and the housing may be identical to each other, and the elastic spline cover may rotate in opposite directions with respect to the bearing portion and the housing.

A reduction ratio of the elastic spline cover and the housing may be in a range of 20:1 to 200:1.

The harmonic gear may include a power transmitter configured to transfer power between the rotation shaft of the motor and the bearing portion, the power transmitter may include a boss coupled to the rotation shaft of the motor, a coupling member including a flange protruding outward from one end of the boss, and a rotating plate that interferes with and rotates in conjunction with rotation of the boss, a first protrusion may be provided on one of upper surfaces of the flange and the rotating plate and a first recess into which the first protrusion is inserted may be provided on a remaining upper surface, and a second protrusion may be provided on one of a lower surface of the rotating plate and an upper surface of the bearing portion and a second recess into which the second protrusion is inserted may be provided on a remaining surface.

The electric independent steering apparatus may further include an upper bearing provided above the harmonic gear, and fixing the harmonic gear to the upper support and pivotably supporting the harmonic gear simultaneously, and a lower bearing provided below the second knuckle, and fixing the second knuckle to the lower support and pivotably supporting the second knuckle simultaneously, wherein the inner ring of the upper bearing may have one surface fixed to the upper support around the upper pivot shaft coupled through the upper support and a remaining surface to which a fastener disposed through the elastic spline cover is fixed.

Advantageous Effects

In an electric independent steering apparatus according to an embodiment of the present disclosure, First, through the electric independent steering apparatus, each wheel may be separately driven, and thus when the electric independent steering apparatus is applied to a vehicle, it may be possible to implement various driving modes.

Second, the structure of the steering apparatus may be simplified by eliminating the complicated linkage structure essential to the steering apparatus.

Third, an internal space of the vehicle may be increased and weight reduction may be achieved by simplifying the structure.

Fourth, powerful yet precise steering performance compared to motor output may be provided by applying a harmonic gear.

Figure 4:
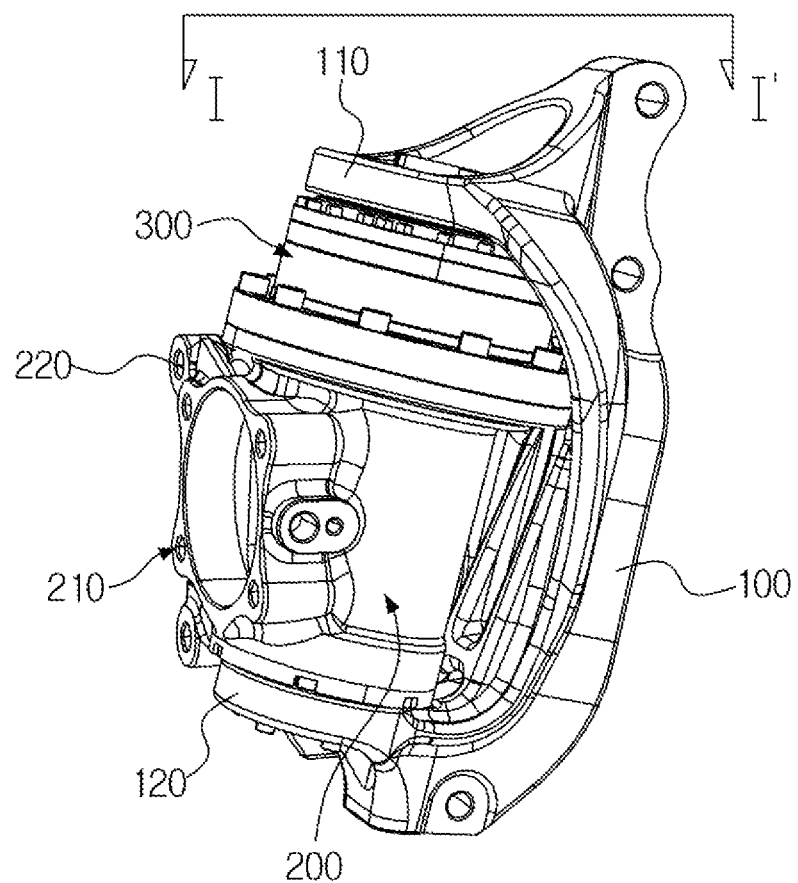
FIG. 4 is a perspective view of the electric independent steering apparatus shown in FIG. 3.

FIG. is an exploded perspective view showing a state in which the electric independent steering apparatus shown in FIG. 4 is disassembled.

Figure 5:
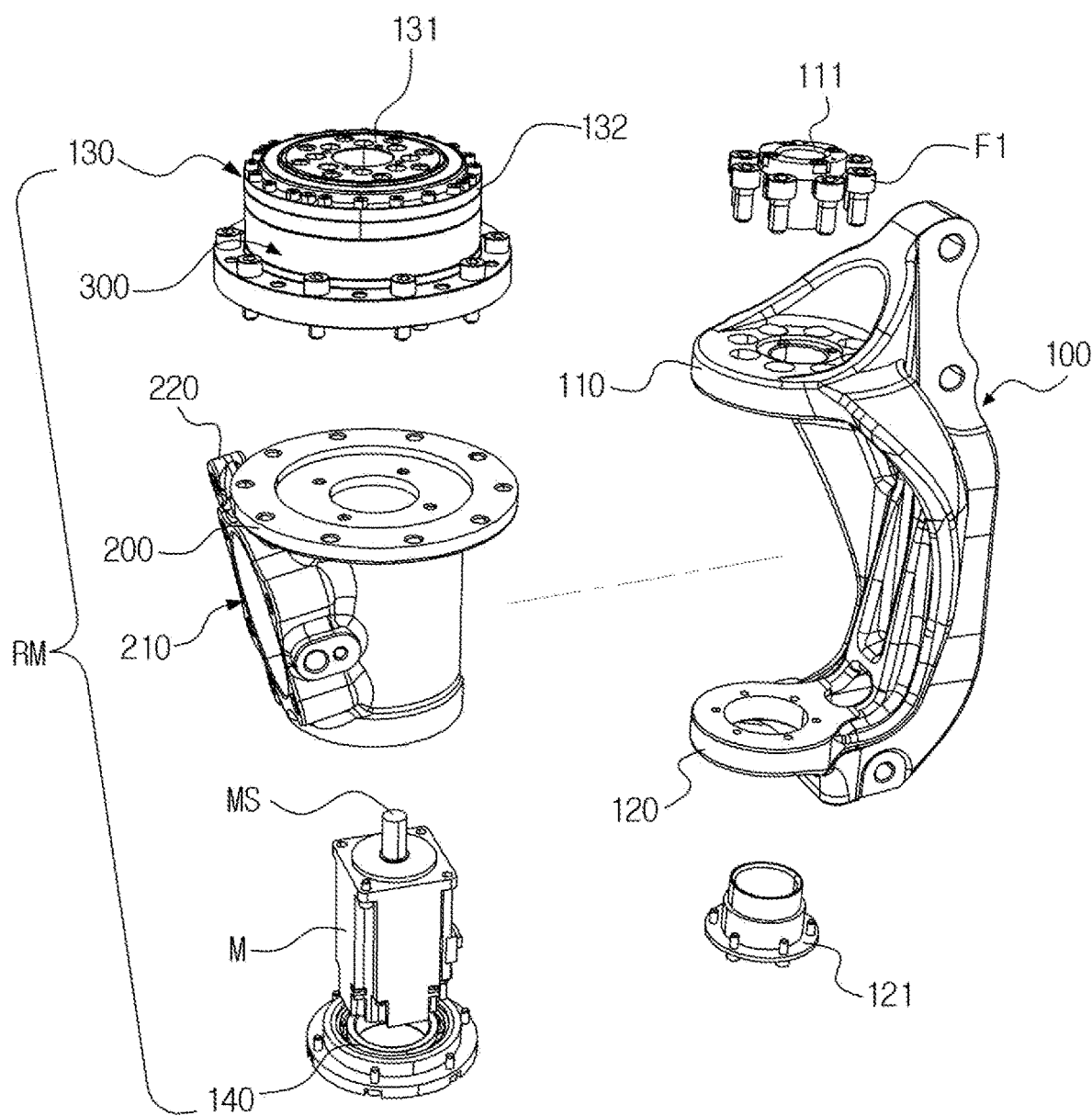
Figure 6:
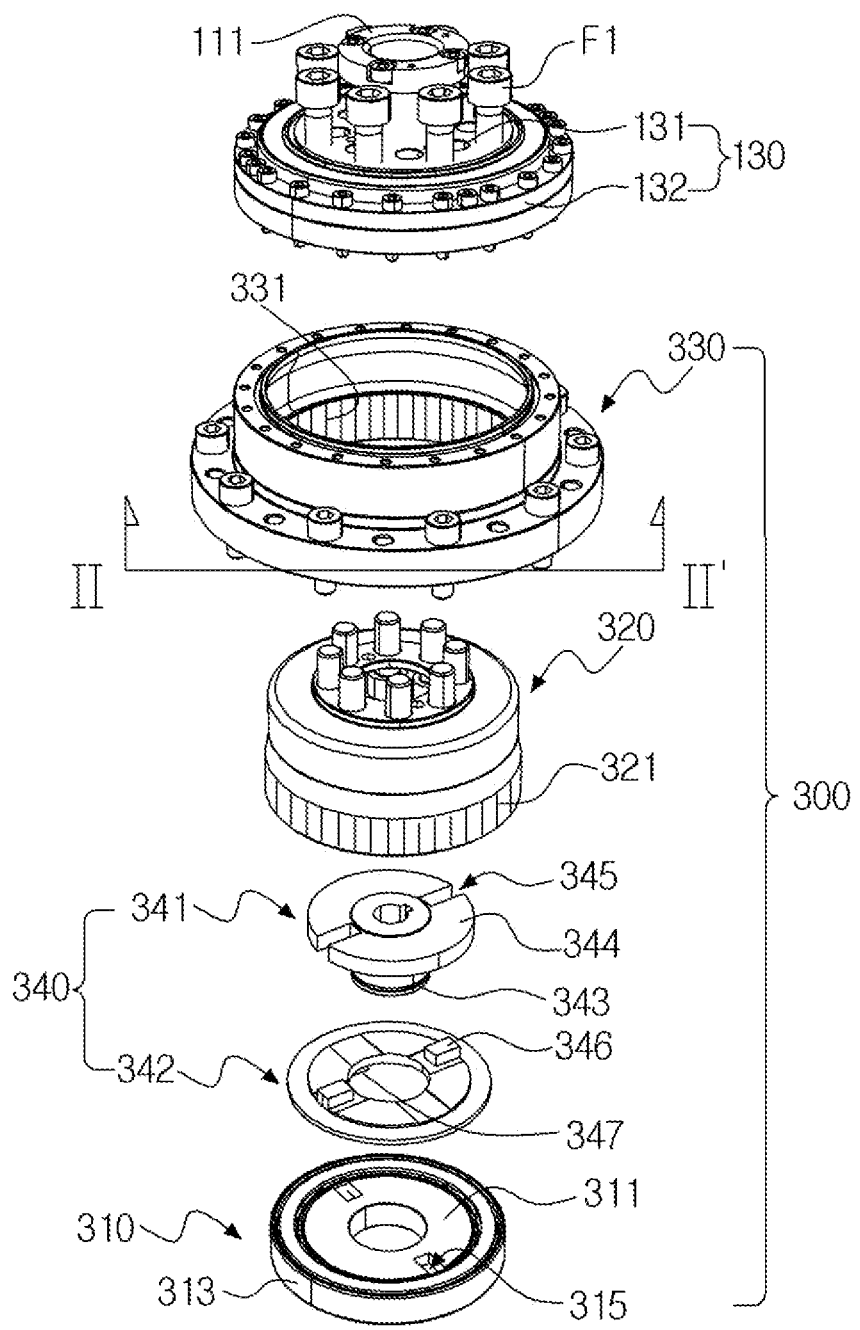

FIG. 6 is an exploded perspective view showing a state in which a harmonic gear of the electric independent steering apparatus shown in FIG. 5 is disassembled.

Figure 7:
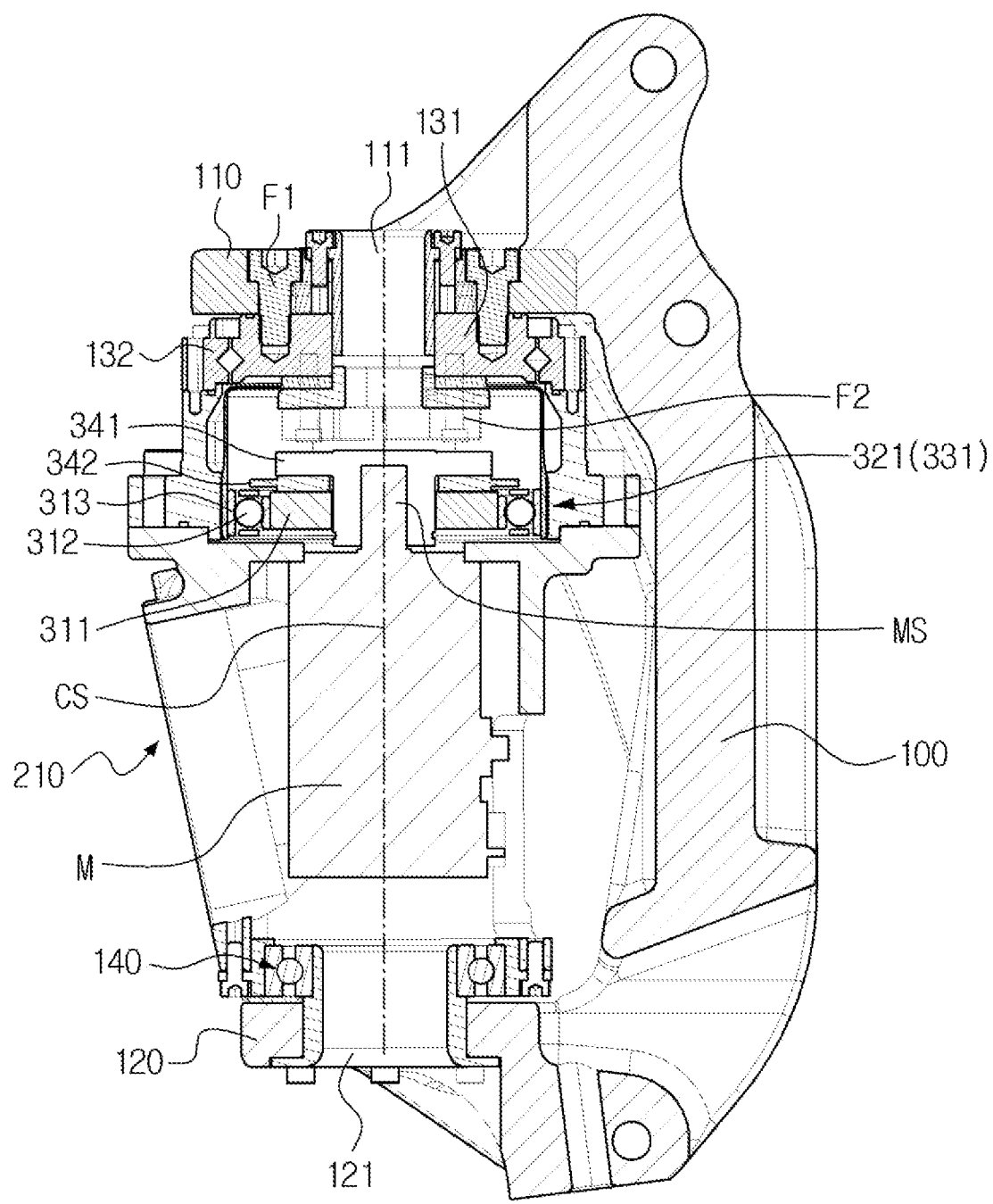

FIG. 7 is a cross-sectional view taken along I-I' of the electric independent steering apparatus shown in FIG. 4.

FIG. 8 is a cross-sectional view taken along II-II' of the electric independent steering apparatus shown in FIG. 6.

FIG. 9 is a reference diagram showing a state in which an electric independent steering apparatus operates to change a steering angle of a wheel, according to an embodiment of the present disclosure.

BEST MODE

As the disclosure allows for various changes and numerous embodiments, particular embodiments will be illustrated in the drawings and described in detail in the written description.

However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms.

The terms are used only for the purpose of distinguishing one constituent element from another constituent element.

For example, a first element may be termed a second element and a second element may be termed a first element without departing from the teachings of the present disclosure.

The term and/or includes a combination of a plurality of related recited items or any one of a plurality of related recited items.

It will be understood that when an element is referred to as being "on", "connected to" or "coupled to" another element, it may be directly on, connected or coupled to the other element or intervening elements may be present.

In contrast, when an element is referred to as being "directly on," "directly connected to" or "directly coupled to" another element or layer, there are no intervening elements or layers present.

The terms used in the present specification are used for explaining a specific exemplary embodiment, not limiting the present disclosure.

The singular expressions in the present specification include the plural expressions unless clearly specified otherwise in context.

The terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Hereinafter, the embodiment will be described in detail with reference to the accompanying drawings, but the same or corresponding components regardless of reference numerals are given the same reference numerals, and overlapping descriptions thereof will be omitted.

Figure 1:
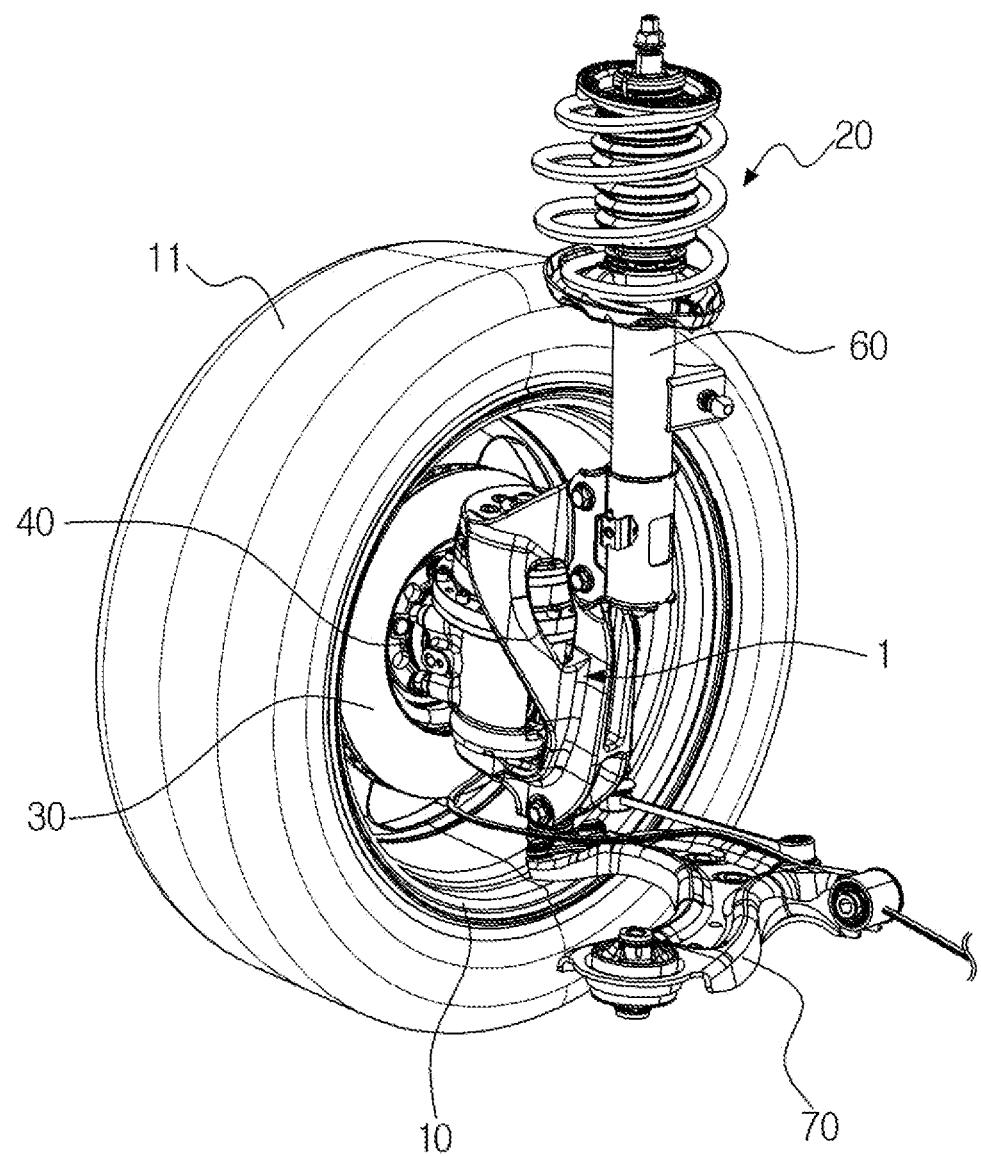
FIG. 1 is a perspective view of a wheel on one side with an electric independent steering apparatus, according to an embodiment of the present disclosure.
Figure 2:
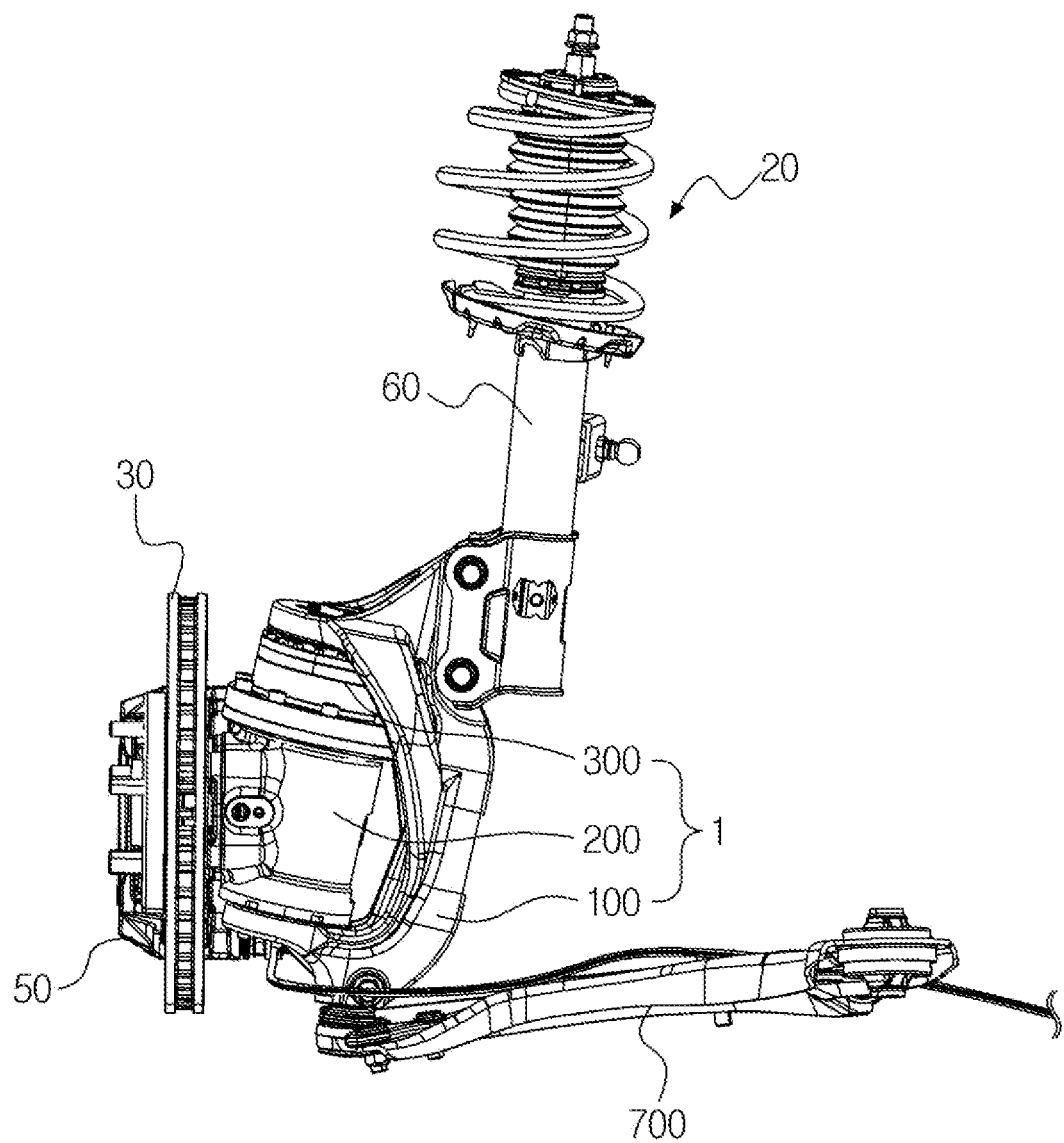
FIG. 2 is a perspective view showing a state in which an electric independent steering apparatus is installed inside the wheel on one side shown in FIG. 1.
Figure 3:
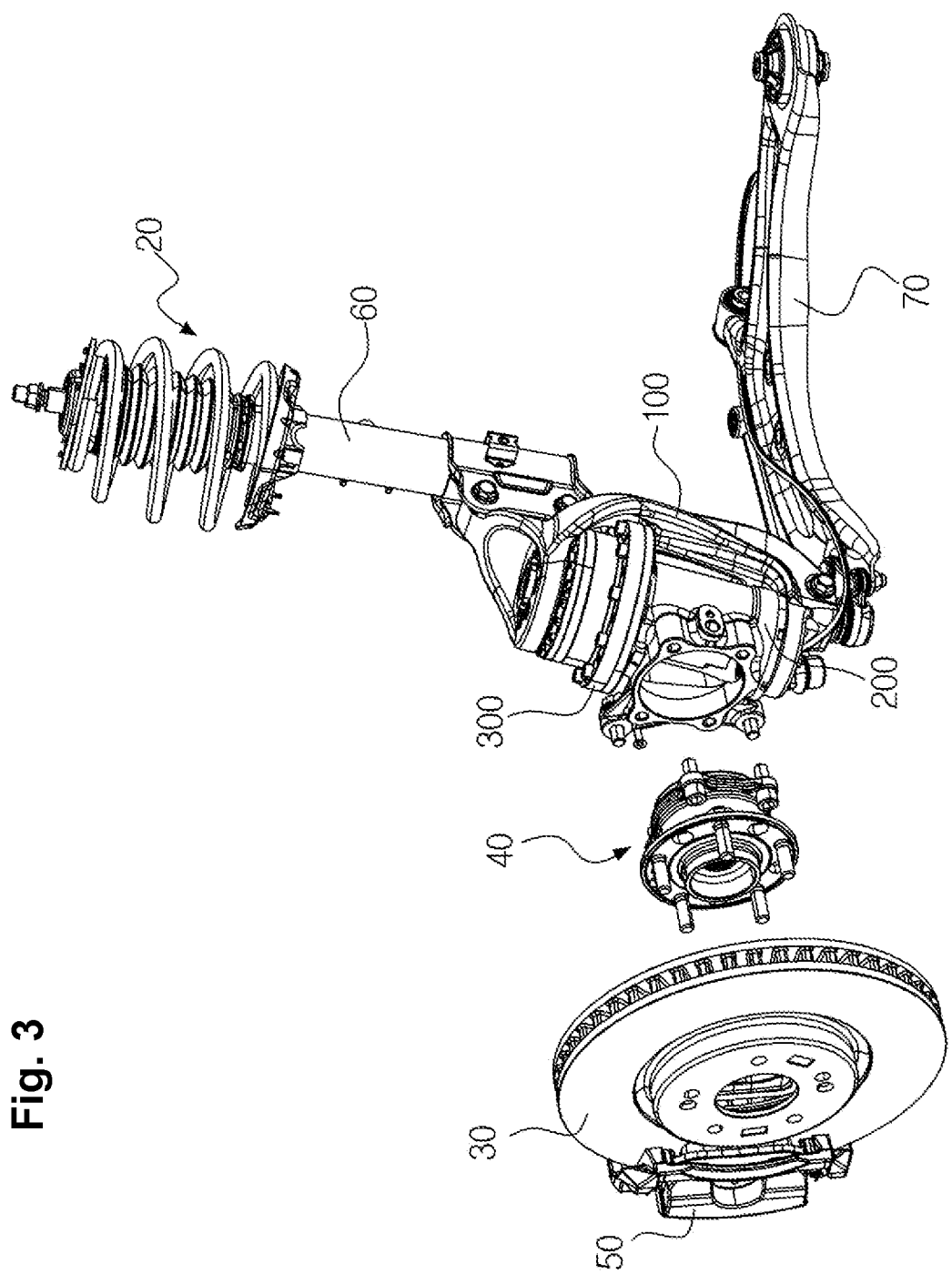
FIG. 3 is an exploded perspective view showing a state in which an internal configuration of the wheel on one side shown in FIG. 2 is disassembled.

FIG. 1 is a perspective view of a wheel on one side with an electric independent steering apparatus, according to an embodiment of the present disclosure. FIG. 2 is a perspective view showing a state in which an electric independent steering apparatus is installed inside the wheel on one side shown in FIG. 1. FIG. 3 is an exploded perspective view showing a state in which an internal configuration of the wheel on one side shown in FIG. 2 is disassembled.

Referring to FIGS. 1 to 3, an electric independent steering apparatus 1 according to an embodiment of the present disclosure includes a first knuckle 100, a second knuckle 200, and a harmonic gear 300. The first knuckle 100 is placed inside a vehicle body, and the second knuckle 200 is placed outside the first knuckle 100.

The inside of the wheel 10 on one side of the vehicle will now be described. The wheel 10 to which a tire 11 is coupled is rotatably coupled to one side of a hub bearing 40 along with a wheel disk 30.

The other side of the hub bearing 40 is coupled and fixed to a side surface of the second knuckle 200, and a braking portion 50 that selectively limits rotational force of the wheel disk 30 is also coupled to the second knuckle 200.

Although not shown, an in-wheel motor driving method may be applied to each wheel 10 including the electric independent steering apparatus 1 according to an embodiment of the present disclosure. That is, a motor may be installed inside the wheel 10 to independently provide driving force to each wheel, and the electric independent steering apparatus 1 may be provided in each wheel 10 to independently control a steering angle of a wheel.

A strut portion 60 may be coupled to an upper portion of the first knuckle 100, and a lower arm 70 may be coupled to a lower portion of the first knuckle 100. A suspension 20 may be provided above the strut portion 60.

FIG. 4 is a perspective view of the electric independent steering apparatus shown in FIG. 3. FIG. 5 is an exploded perspective view showing a state in which the electric independent steering apparatus shown in FIG. 4 is disassembled.

Referring to FIGS. 4 and 5, the first knuckle 100 is provided with an upper support 110 and a lower support 120 toward a position at which the wheel 10 is disposed. The upper support 110 and the lower support 120 integrally extend and protrude from a side surface of the first knuckle 100 to face each other, and the second knuckle 200 and the harmonic gear 300 are coupled to each other between the upper support part 110 and the lower support part 120. Hereinafter, the state in which the second knuckle 200 and the harmonic gear 300 are coupled is referred to as a rotation module RM.

The rotation module RM is pivotably disposed within the first knuckle 100. In this case, in the rotation module RM, an upper surface of an upper bearing 130 provided above the harmonic gear 300 is fixed to the upper support 110, and a lower bearing 140 provided below the second knuckle 200 is fixed to the lower support 120.

An upper pivot shaft 111 is inserted into the upper support 110 to become a rotation center of the upper bearing 130, and a lower pivot shaft 121 is inserted into the lower support 120 to become the rotation center of the lower bearing 140. A fastener F1 that penetrates the upper support 110 and is fixed to the upper surface of an inner ring 131 of the upper bearing 130 is fastened to the upper support 110.

An outer ring 132 of the upper bearing 130 is coupled to a housing 330. The housing 330 will be described below in detail.

A motor M is installed inside the second knuckle 200. The motor M may be applied as a servomotor. The motor M may control a rotation direction and rotation speed with a separate controller (not shown).

A hub bearing mounting portion 210 to which the hub bearing 40 (refer to FIG. 3) is provided on one side surface of the second knuckle 200. The hub bearing 40 is disposed to have a predetermined inclination angle with the second knuckle 200, and thus the hub bearing mounting portion 210 is also provided as an inclined surface to be inclined in a downward direction with respect to the second knuckle 200.

A braking portion mounting portion 220 adjacent to the hub bearing mounting portion 210 is provided in the second knuckle 200. The braking portion 50 (refer to FIG. 3) may be fixed onto the braking portion mounting portion 220 to selectively pressurize and rub against the rotating wheel disk 30 (refer to FIG. 3).

FIG. 6 is an exploded perspective view showing a state in which the harmonic gear of the electric independent steering apparatus shown in FIG. 5 is disassembled. FIG. 7 is a cross-sectional view taken along I-I' of the electric independent steering apparatus shown in FIG. 4. FIG. 8 is a cross-sectional view taken along II-II' of the electric independent steering apparatus shown in FIG. 6. Here, FIGS. 8A and 8B are cross-sectional views showing a state in which a bearing portion 310 and the housing 330 rotate around a fixed elastic spline cover 320.

Referring to FIGS. 6 to 8, the harmonic gear is coupled to an upper portion of the second knuckle 200 and receives rotational force from a motor to transfer pivoting to the rotation module RM (refer to FIG. 5). Accordingly, a steering function may be performed by implementing a relative rotational movement of the second knuckle 200 with respect to the first knuckle 100.

The harmonic gear 300 includes the bearing portion 310, the elastic spline cover 320, and the housing 330.

The bearing portion 310 includes an inner ring 311 that is connected to a rotation shaft MS of the motor M and shaped like an oval, and an outer ring 313 that is elastically deformed to protrude in a long axis direction MD according to rotation of the inner ring 311 through a plurality of balls 312 on the outside of the inner ring 311

That is, the inner ring 311 has a roughly thin elliptical pillar shape, and a power transmitter 340 is coupled to the rotation center to receive the rotational force of the motor M and rotate, and in this regard, the balls 312 outside the inner ring 311 performs a rolling contact movement inside the outer ring 313 according to rotation of the inner ring 311. In this case, the outer ring 313 protrudes in the long axis direction MD of the inner ring 311 and has an elastic ring shape to be retracted in a short axis direction. Although not shown in the drawing, a retainer that holds the balls 312 may be provided inside the bearing portion 310 between the inner ring 311 and the outer ring 313.

In addition, the inner ring 311 is coupled to the power transmitter 340 and receives power from the motor M, and the power transmitter 340 includes a coupling member 341 and a rotating plate 342.

The coupling member 341 includes a boss 343 coupled to the rotation shaft MS of the motor M, and a flange 344 protruding outward from one end of the boss 343. The boss 343 may be coupled to the rotation shaft MS of the motor through a key fastening structure. The rotation shaft MS of the motor may be provided between the upper pivot shaft 111 and the lower pivot shaft 121 and arranged on a line of a rotation center shaft CS formed therebetween. The rotation module RM may constitute a rotation center based on the rotation center shaft CS. The rotational force of the rotation shaft MS of the motor is primarily transferred to the boss 343. The flange 344, which is formed integrally with the boss 343, is provided with a first recess 345 shaped like at least one groove, and the first recess 345 is arranged to interfere with a first protrusion 346 provided on an upper surface of the rotating plate 342 Therefore, the rotating plate 342 rotates in conjunction with the coupling member 341. A second protrusion 347 is provided on a lower surface of the rotating plate 342, and is inserted into a second recess 315 formed on an upper surface of the inner ring 311 of the bearing portion 310 to transmit rotational force to the bearing portion 310. Although not shown in the drawings, the first protrusion 346 and the first recess 345, and the second protrusion 347 and the second recess 315 may be arranged in opposite directions.

The elastic spline cover 320 has a hollow cylindrical shape, with one side open and the other side closed, such as a container.

The bearing portion 310 is coupled to an inner peripheral surface of one side of the elastic spline cover 320, and an area at one end of the bearing portion 310 is elastically deformed in response to elastic deformation of the outer ring 313 of the bearing portion 310. The power transmitter 340 is coupled to the bearing portion 310 and accommodated inside the elastic spline cover 320. A medial tooth shape 321 is provided on one outer peripheral surface of the elastic spline cover 320. The other side of the elastic spline cover 320 is fixed to a lower surface of the inner ring 131 of the upper bearing 130 through a fastener F2. Therefore, the elastic spline cover 320 is fixed to the upper support 110 together with the inner ring 131 of the upper bearing 130.

In the housing 330, an external tooth shape 331 is formed at one side of an inner peripheral surface at a position corresponding to the medial tooth shape 321 of the elastic spline cover 320. One side of the housing 330 is fixed on the second knuckle 200, and the outer ring 132 of the upper bearing 130 is coupled to the other side of the housing 330.

Therefore, as the medial tooth shape 321 of the elastic spline cover 320 is engaged with the external tooth shape 331 in the long axis direction MD, rotational force is transmitted relative to the housing 330 with respect to the fixed elastic spline cover 320. The outer ring 132 of the upper bearing 130 is coupled to an upper portion of the housing 330, and the second knuckle 200 is coupled thereto, and thus may rotates together.

In the harmonic gear 300, the bearing portion 310 and the housing 330 may have the same rotation direction.

A reduction ratio of the elastic spline cover 320 and the housing 330 may be in the range of 20:1 to 200:1, and in detail, the reduction ratio may be 100:1.

FIG. 9 is a reference diagram showing a state in which an electric independent steering apparatus operates to change a steering angle of a wheel, according to an embodiment of the present disclosure.

Figure 9A:
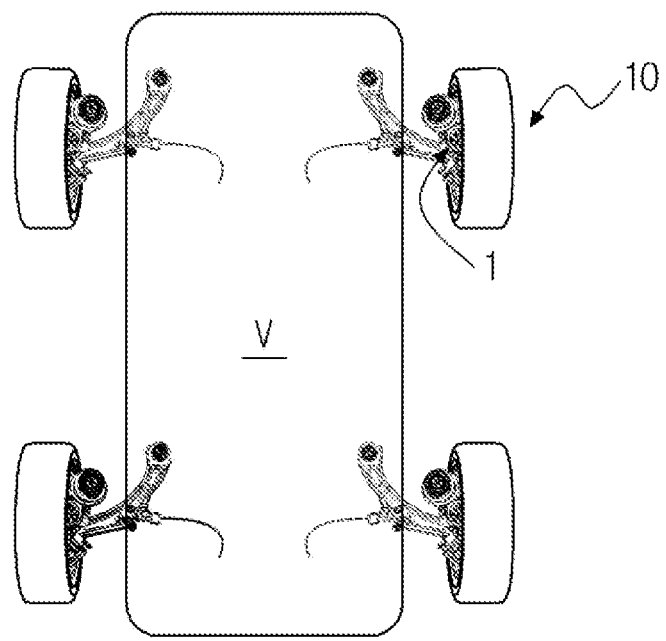
Figure 9B:
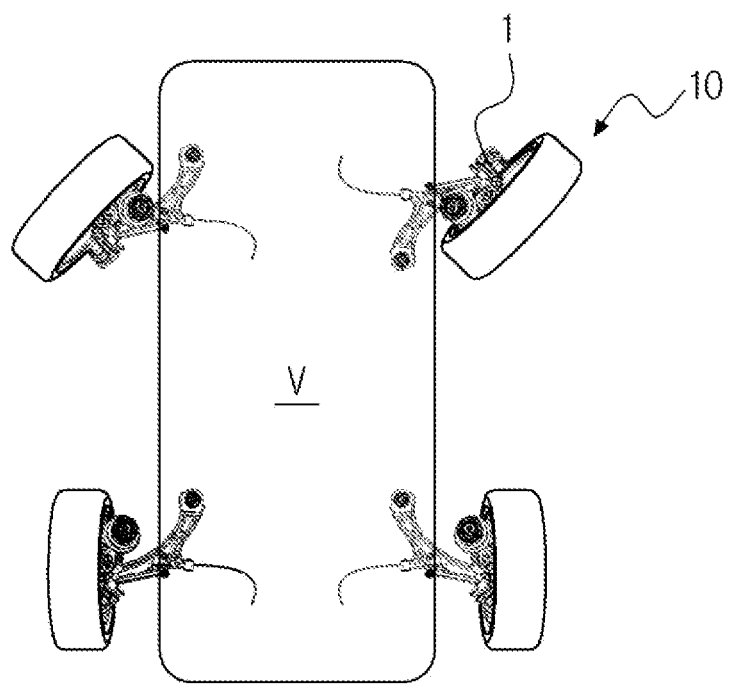
Figure 9C:
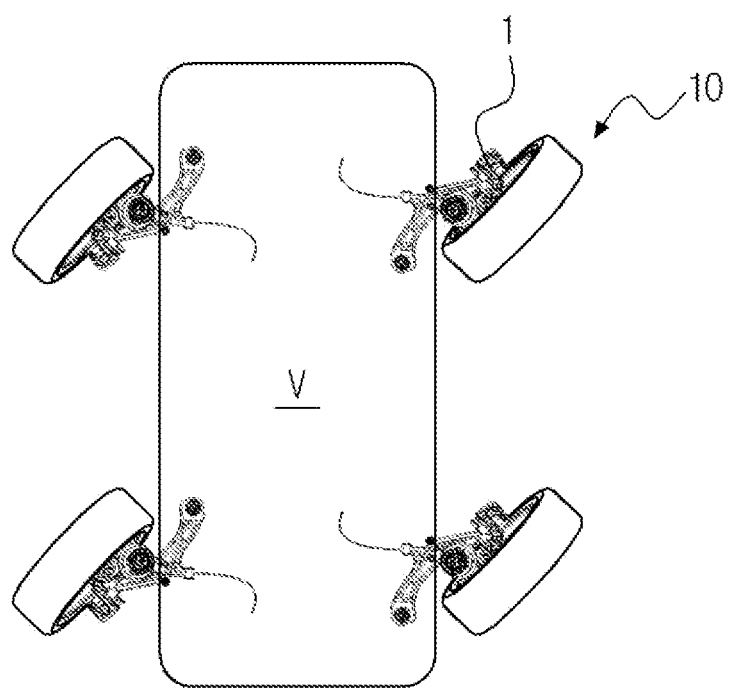

FIG. 9A shows a state of a wheel when a vehicle V moves in a straight direction. FIG. 9B shows a state in which the vehicle V turns right (a state in which the vehicle V turns approximately 45 degrees). The state of the wheel 10 may provide the same function and effect as a general vehicle by using the electric independent steering apparatus 1.

FIG. 9O shows a state in which the vehicle V changes lanes to a right lane. That is, all wheels rotate in the same direction to the right, enabling steering in a horizontal movement mode.

In the case of a general vehicle V, some of the four wheels 10 provide driving force (excluding four-wheel drive), and some are involved in steering. In a vehicle using the electric independent steering apparatus 1 of the present disclosure, steering in a horizontal movement mode may be implemented with all four wheels rotating in a direction of movement. This horizontal movement mode is different from a structure in which a general vehicle changes lanes through turning, and has an effect of responding more safely to a situation such as sudden lane changes.

Figure 9D:
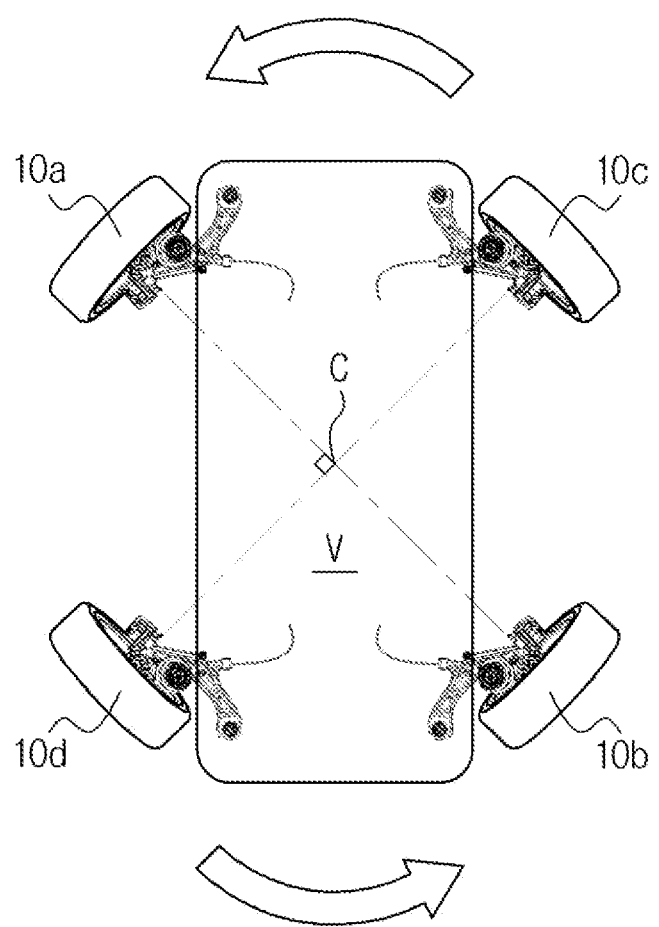

FIG. 9D shows a steering state in a stationary rotation mode, which allows a vehicle to rotate 360 degrees in place.

For example, a left front wheel 10a and a right rear wheel 10b are rotated to face each other, and a right front wheel 10c and a left rear wheel 10d are rotated to face each other. When virtual extension lines facing each other are orthogonal to each other, an in-place rotation mode may be applied.

In other words, when each of the electric independent steering apparatus 1 is rotated about 45° to face the rotation center C of the vehicle V, the left wheels 10a and 10d are driven rearward, and the right wheel 10c and 10b are driven forward, the vehicle V may be rotated leftward (counterclockwise) in place.

Figure 9E:
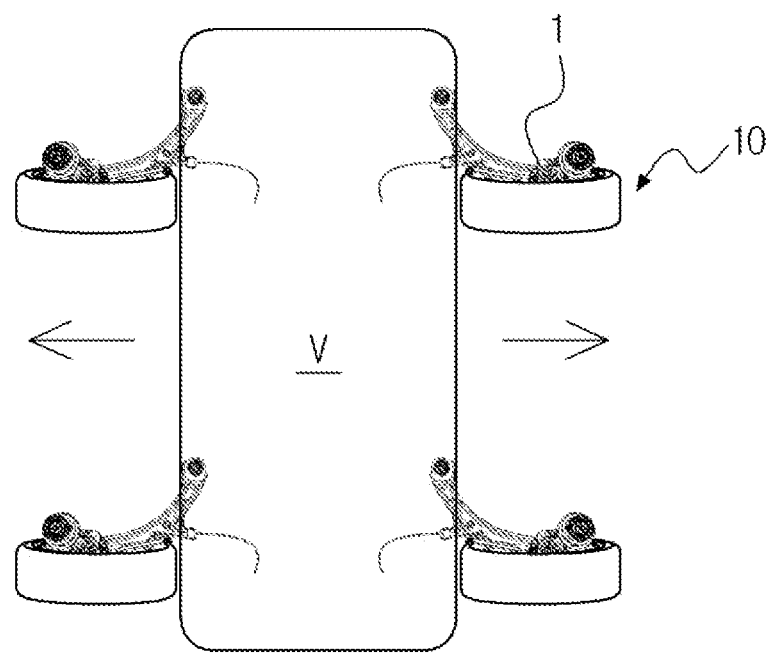

FIG. 9E shows a fully horizontal movement mode, which is a state in which the vehicle moves horizontally (rotated about 90 degrees).

In other words, the vehicle V usually moves in a front direction in which a driver faces, but in the case of FIG. 9E, the vehicle V may move toward a side surface of the driver.

This fully horizontal movement mode helps to more easily perform parallel parking with narrow spacing. Conversely, even if the vehicle gets out of a gap with a narrow gap between the front and back, the vehicle may easily get out by using a fully horizontal movement mode.

Therefore, when the electric independent steering apparatus according to an embodiment of the present disclosure is used, each wheel may be driven separately through the electric independent steering apparatus, and thus when the electric independent steering apparatus is applied to a vehicle, various driving modes may be implemented, the structure of the steering apparatus may be simplified by eliminating the complicated linkage structure essential to the steering apparatus, an internal space of the vehicle may be increased and weight reduction may be achieved by simplifying the structure, and powerful yet precise steering performance compared to motor output may be provided by applying a harmonic gear.

As described above, the present disclosure has been described with reference to the embodiments shown in the drawings, but this is only for explaining the disclosure, and one of ordinary skill in the art to which the present disclosure belongs would understand that various modifications or equivalent embodiments are possible from the detailed description of the present disclosure. Therefore, the scope of the present disclosure needs to be determined by the technical spirit of the claims.

Sequence Listing Free Text

1: electric independent steering apparatus
100: first knuckle
200: second knuckle
300: harmonic gear
310: bearing portion
320: elastic spline cover
330: housing
340: power transmitter
10: wheel

The invention claimed is:

1. An electric independent steering apparatus comprising:
a first knuckle provided to be coupled to a strut portion and including an upper support extending and protruding outward from one end thereof and a lower support extending and protruding from a remaining end to face the upper support;
a second knuckle arranged to be rotatable with respect to the first knuckle and including a motor installed therein and a driving wheel connected to an outside thereof; and
a harmonic gear provided between the first knuckle and the second knuckle, connected to the motor, and configured to cause decelerated rotation of the second knuckle with respect to the first knuckle,
wherein the second knuckle, the motor, and the harmonic gear constitute a rotation module performing a steering function,
an upper pivot shaft is disposed in the upper support and a lower pivot shaft is disposed in the lower support to constitute a rotation center of the rotation module, and
a rotation shaft of the motor is provided between the upper pivot shaft and the lower pivot shaft and arranged on a line of a rotation center shaft formed therebetween.

2. The electric independent steering apparatus of claim 1, further comprising:
a hub bearing provided between the second knuckle and the driving wheel;
a wheel disk coupled onto the hub bearing; and
a braking portion coupled to the second knuckle to limit rotational force of the wheel disk.

3. The electric independent steering apparatus of claim 1, wherein the harmonic gear includes:
a bearing portion including an inner ring connected to the rotation shaft of the motor and shaped like an oval and an outer ring that is elastically deformed along the oval shape of the inner ring through a plurality of balls provided outside the inner ring;
an elastic spline cover that is elastically deformed along an oval shape as the bearing portion is inserted into one side of an open inner peripheral surface of the elastic spline cover, includes a medial tooth shape provided on one side of an outer peripheral surface of the elastic spline cover, and having a remaining side fixed and connected to the upper support; and a housing into which the elastic spline cover is inserted and which has an inner peripheral surface on which external tooth shapes engaged with both sides in a long axis direction of the medial tooth shape are formed and pivots relative to the fixed elastic spline cover along with rotation of the bearing portion.

4. The electric independent steering apparatus of claim 3, wherein, in the harmonic gear, rotation directions of the bearing portion and the housing are identical to each other, and the elastic spline cover rotates in opposite directions with respect to the bearing portion and the housing.

5. The electric independent steering apparatus of claim 3, wherein a reduction ratio of the elastic spline cover and the housing is in a range of 20:1 to 200:1.

6. The electric independent steering apparatus of claim 3, wherein the harmonic gear includes a power transmitter configured to transfer power between the rotation shaft of the motor and the bearing portion, the power transmitter includes a boss coupled to the rotation shaft of the motor, a coupling member including a flange protruding outward from one end of the boss, and a rotating plate that interferes with and rotates in conjunction with rotation of the boss, a first protrusion is provided on one of upper surfaces of the flange and the rotating plate and a first recess into which the first protrusion is inserted is provided on a remaining upper surface, and a second protrusion is provided on one of a lower surface of the rotating plate and an upper surface of the bearing portion and a second recess into which the second protrusion is inserted is provided on a remaining surface.

7. The electric independent steering apparatus of claim 3, further comprising:

an upper bearing provided above the harmonic gear, and fixing the harmonic gear to the upper support and pivotably supporting the harmonic gear simultaneously; and a lower bearing provided below the second knuckle, and fixing the second knuckle to the lower support and pivotably supporting the second knuckle simultaneously, wherein the inner ring of the upper bearing has one surface fixed to the upper support around the upper pivot shaft coupled through the upper support and a remaining surface to which a fastener disposed through the elastic spline cover is fixed.

\* \* \* \* \*